(12) United States Patent
Coubray et al.

(10) Patent No.: US 6,257,303 B1
(45) Date of Patent: Jul. 10, 2001

(54) RACK AND PINION DOOR DRIVE SYSTEM

(75) Inventors: Bruce Arthur Coubray; Allan Keith Coubray, both of Auckland (NZ)

(73) Assignee: Howick Engineering Limited, Howick (NZ)

(*) Notice: Subject to any disclaimer, the term of this patent is extended or adjusted under 35 U.S.C. 154(b) by 0 days.

(21) Appl. No.: 09/280,516

(22) Filed: Mar. 31, 1999

Related U.S. Application Data

(63) Continuation-in-part of application No. PCT/NZ97/00143, filed on Oct. 24, 1997.

(30) Foreign Application Priority Data

Nov. 8, 1996 (NZ) .................................................. 299721
Mar. 31, 1998 (NZ) .................................................. 330098

(51) Int. Cl.⁷ .................................................. E05D 15/06
(52) U.S. Cl. .................... 160/188; 160/201; 49/197; 74/89.18; 74/422
(58) Field of Search ...................... 49/197, 199, 200, 49/201, 360, 361, 362, 325; 74/89.18, 422, DIG. 10, 424.6; 160/188, 189, 201, 341, 133

(56) References Cited

U.S. PATENT DOCUMENTS

| | | | |
|---|---|---|---|
| 2,251,308 | * 8/1941 | Washington | 424/6 |
| 3,061,006 | * 10/1962 | Hazlett | 160/242 |
| 3,591,981 | * 7/1971 | Law | 49/139 |
| 4,188,752 | 2/1980 | Monot | 49/218 |
| 4,541,293 | * 9/1985 | Caugant et al. | 74/89.18 |
| 4,570,617 | * 2/1986 | Baus | 74/422 |
| 4,984,387 | 1/1991 | Wheatland | 49/362 |
| 5,351,441 | 10/1994 | Hörmann | 49/362 |
| 5,515,650 | 5/1996 | Machill | 49/362 |
| 5,572,829 | * 11/1996 | Stoltenberg | 49/199 |
| 5,680,729 | * 10/1997 | Heffington | 49/362 |
| 5,842,598 | * 12/1998 | Tsuchida | 74/89.18 |
| 5,918,418 | * 7/1999 | Richmond et al. | 49/139 |
| 5,921,611 | * 7/1999 | Townsend | 49/199 |

FOREIGN PATENT DOCUMENTS

| | | |
|---|---|---|
| 44173/85 | 4/1986 | (AU) . |
| 2330461 | 1/1971 | (DE) . |
| 2645803 | 4/1978 | (DE) . |
| 4016707 | 11/1991 | (DE) . |
| 29609982 | 10/1996 | (DE) . |
| 19628289 | 2/1997 | (DE) . |
| 19538798 | 4/1997 | (DE) . |
| 0033639 | 8/1981 | (EP) . |
| 0313119 | 4/1989 | (EP) . |
| 2067726 | 8/1971 | (FR) . |
| 2541717 | 8/1984 | (FR) . |
| 2266921 | 11/1993 | (GB) . |
| WO90/12185 | 10/1990 | (WO) . |
| WO94/13917 | 6/1994 | (WO) . |
| WO95/30064 | 11/1995 | (WO) . |

OTHER PUBLICATIONS

Derwent Abstract Accession No: 86–059936/09, JP 61–013061 A, (Asahi Chemical Ind KK) , Jan. 21, 1986.
Patent Abstracts of Japan, M–1132, p. 25, JP 3–87487 A, (Toyo Exterior Co Ltd) , Apr. 12, 1991.
Derwent Abstract Accession No: B2894C/06, NL 7807427 A, (SCHIJF) , Jan 14, 1980.

* cited by examiner

*Primary Examiner*—Daniel P. Stodola
*Assistant Examiner*—Curtis A. Cohen
(74) *Attorney, Agent, or Firm*—Jacobson, Price, Holman & Stern, PLLC

(57) ABSTRACT

A drive for a tracked door which utilises a drive pinion which engages a tracked rack that in turn moves the door as it is moved track-wise under the action of the pinion. A flexible rack able to travel on a curved locus is preferred.

26 Claims, 14 Drawing Sheets

FIGURE 15
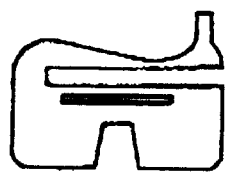
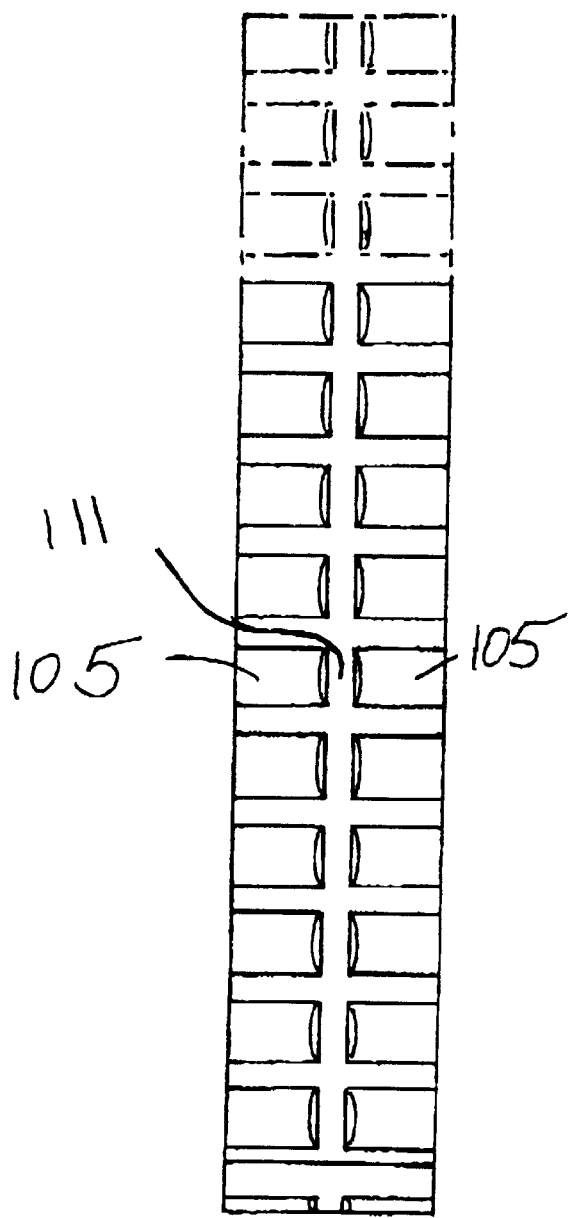
FIGURE 14
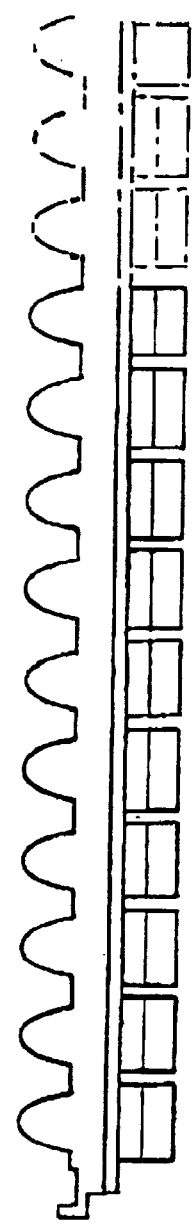
FIGURE 16

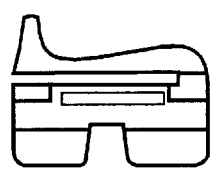
FIGURE 18
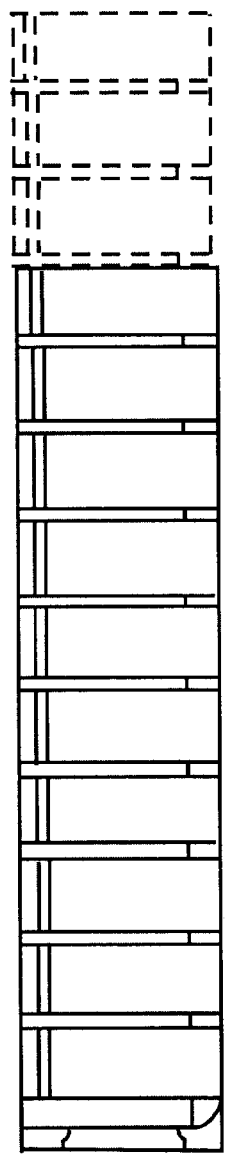
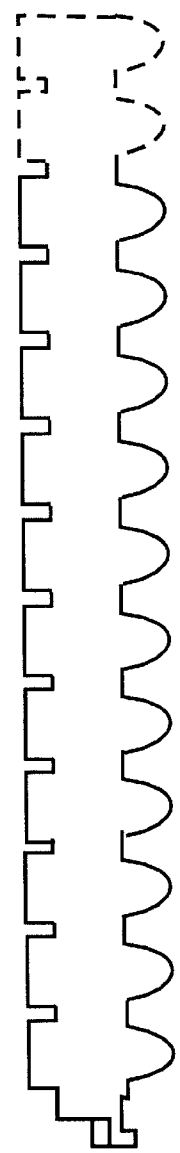
FIGURE 17     FIGURE 19

RACK AND PINION DOOR DRIVE SYSTEM

This application is a Continuation-in-Part of PCT/NZ97/00143, filed Oct. 24, 1997.

TECHNICAL FIELD

The present invention relates to improvements in and/or relating to a rack and pinion drive assembly.

The invention also consists in related means and methods.

In the automatic door business, doors are normally of three types—curtain, panel or sectioned.

A curtain door is normally pulled from a roll and normally consists of a pliable structure or an articulated structure usually provided with some measure of guidance on the edges thereof.

A panel door, by contrast, is normally supported so as to be capable of being swung up and over an entrance way or otherwise hinged relative to an entrance way.

A sectioned door normally comprises a plurality of parallel hinged panels, each of which is substantially centrally pivoted along a pivot axis parallel to the hinge axes and the pivoting axle structures are preferably guided so that the section door can follow roughly to the locus of the guides.

The present invention provides an alternative mechanism useful in the provision of curtain or section doors such as for example panneled or sectional doors irrespective of whether or not they are to be vertically moveable, horizontally moveable or otherwise.

It is therefore an object of the present invention to provide means and/or methods which go some way to meet the abovementioned desiderata or which will at least provide the public with an alternative drive assembly.

DISCLOSURE OF INVENTION

In a first aspect the present invention consists in a door assembly of a kind having a door (preferably a sectioned type door but not necessarily so) tracking on either side of the door in a fixed track to allow reproducible opening and closing thereof, the assembly being characterised in that a rack is tracked to move on a fixed locus and is connected (directly or indirectly) to the door such that movement of such rack on its tracked locus will cause the opening or closing of the door, the rack being engaged by or being engageable by a meshing door opening and/or closing gear, pinion or sprocket (hereafter "pinion") of or from a door opener whereby the door is thus capable of being opened upon the door opener controlled rotation of said pinion in one direction and of being closed upon the door opener controlled rotation of such pinion in the other direction.

In some forms the term "rack" may include a chain and the term "pinion" a sprocket.

Preferably said rack is sufficiently flexible or deformable so as axially to follow a curved track whilst being driven/pulled/pushed by said pinion.

Preferably said deformable rack follows a locus appropriate for a sectioned door (preferably a similar locus to that of the tracks of the door).

Preferably said door is a sectioned type door.

Preferably said locus includes a curve and preferably said pinion providing the drive is at said curve.

Preferably said pinion is on the convex side of a curve.

Preferably said rack can be driven in compression to take the door with it or can be moved in tension to take the door with it.

Preferably a lower region only of the door is fixed to said rack.

Preferably said rack is of a form hereinafter defined and/or described.

Preferably said door is counterbalanced by a pulley and weight system or use of a torsion or spring arrangement linked to the door.

Preferably any such counterbalancing arrangement is preferably attached to the bottom section where the door is a sectioned door and preferably also there is provided one rack only on one edge and that rack is attached to said door at said lower section.

Preferably the door is a sectioned door and there is a channel track for wheels, rollers or the like of the sectioned door disposed on each side of the door (the rollers, wheels or the like extending outwardly from the edge of the door defined by the plurality of the panels) and preferably at least one of said tracks has [substantially corresponding to the locus of the tracking wheels, rollers or the like] a track (preferably a channel) for a flexible or deformable rack in accordance with the present invention.

While in some forms of the present invention a non-flexible or deformable rack can be utilised if there is sufficient head room for the rack to continue upwardly over the door portal, such a form of the invention is much less preferred than one that does not require such head room, ie. utilises a flexible and/or deformable rack which can always be accommodated since it can be associated with the locus of the track required for the door in any event.

In a further aspect the present invention consists in a method of opening/closing a curtain, panel or sectioned door (preferably sectioned) which comprises engaging the door at an edge with a rack capable of being driven by a pinion in at least one of two directions (preferably both directions), and subsequently using the pinion to open or close the door.

Preferably said method is performed using apparatus previously defined and/or using a rack providing element as hereinafter defined.

In still other forms the present invention consists in a method when performed substantially as herein described with reference to any one or more of the accompanying drawings.

In still a further aspect the present invention consists in a rack, said rack comprising a flexible elongate member capable of taking some loads in tension, and moulded teeth forms on said elongate member which define the teeth of the rack, said rack being deformable in at least one plane.

Preferably said at least one plane is one that allows the teeth to be configured on the outside of a convex curve.

Preferably said elongate member is in the form of a strap.

Preferably said strap includes profile or edging modifications or both (eg. perforations, kinks, ridges or the like) which assists in the association of the teeth forms thereto.

Preferably said teeth forms are formed from a plastics material.

Preferably said teeth forms are moulded singly or as groups on said elongate member.

Preferably said elongate member is of a steel and there are preferably ridges or the like formed transversely thereof.

Preferably the moulding procedure is substantially as hereinafter described whether with or without reference to any of the particular drawings.

In another aspect the invention consists in, in combination, as a kit for driving a tracked door, a rack, a door opener having a pinion adapted to mesh with said rack, and tracking for the rack to provide a locus of movement longitudinally of the rack whilst driven either way by the pinion, the rack throughout any such tracked movement being adapted for direct or indirect engagement to a said tracked door.

In still a further aspect the present invention consists, in combination, a deformable rack in accordance with the present invention and a door opener having a pinion adapted to engage said rack.

Preferably said combination in addition includes a track for said rack.

Preferably said track for the rack is associated with a track to receive the wheels, rollers or the like of a sectioned door.

In a first aspect the present invention consists in a door assembly of a kind having a door (preferably a sectioned type door but not necessarily so) tracking on either side of the door in a fixed track to allow reproducible opening and closing thereof, wherein a rack is tracked to move on a fixed locus and is connected (directly or indirectly) to the door such that movement of such rack on its tracked locus will cause the opening or closing of the door, the rack being engaged by or being engageable by a meshing door opening and/or closing gear, pinion or sprocket (hereafter "pinion") of or from a door opener whereby the door is thus capable of being opened upon the door opener controlled rotation of said pinion in one direction, and wherein in transverse section (at least when projected longitudinally) said rack is bifurcated and the tracked locus is defined by a flange, rail, wall or the like (hereafter "wall") of the fixed track (preferably within which the tracking elements of the door move (eg; wheels, glides or the like, preferably wheels)), the rack being partly outside the wall and partly inside the wall, and wherein the pinion engages the rack over regions thereof on one side of (preferably outside of) the wall.

Preferably said tracking elements are wheels that capture part of the rack inside of the wall.

Preferably said pinion not only meshes with the rack outside of the wall but also keys or indexes into the rack (eg; by a wheel into a longitudinal accommodation of said rack).

In a further aspect the present invention consists in a method of opening/closing a curtain, panel or sectioned door (preferably sectioned) which comprises engaging the door at an edge with a rack capable of being driven by a pinion in at least one of two directions (preferably both directions), and subsequently using the pinion to open or close the door and wherein said method involves the operative use of a door assembly, combination, or rack of the present invention.

Preferably said method is performed using apparatus previously defined and/or using a rack providing element as hereinafter defined.

In still a further aspect the present invention consists in a rack, said rack comprising an elongate member, possibly of variable cross-section transversely, but having in transverse section (at least when projected longitudinally) a bifurcated characteristic that will enable a guided tracking thereof on a flange, rail, wall or the like (hereafter "wall") a channel type track of a panel, curtain, sectioned or the like door) with part of the member on one side (eg; outside) of the wall and with part on the other side (eg; within) the wall, the part to be on one side (eg; outside) of the wall being configured to mesh with a driving pinion.

In still a further aspect the present invention consists in any of the methods, arrangements or the like hereinafter described with reference to any one or more of the accompanying drawings.

BRIEF DESCRIPTION OF DRAWINGS

Preferred forms of the present invention will now be described with reference to the accompanying drawings in which FIGS. 1 to 9 are as filed in our application filed simultaneously herewith;

FIG. 1 being an exploded view of an electric motor.

FIG. 3 is a plan view of one embodiment which provides a cage or housing which provides three (by way of example—there could, for example, be six) axles within the housing.

FIG. 4 is a diagrammatic view of the relationship of a plurality of three input 25 planetary gears with their input side internal gear and a corresponding arrangement of a plurality of three output planetary gears with their output internal gear.

FIG. 5 is a more preferred arrangement to that of FIG. 4 where the pitch circle diameter A' corresponds exactly to that of B' and preferably there are corresponding pitch circle diameters for the two sets of planetary gears.

FIG. 6 is a diagrammatic view looking along the plane of a sectional door showing how the edgewise rollers thereof (preferably located at or parallel to the pivot axis between sections) can be guided reproducibly in a known manner in a known side track for such doors.

FIG. 7 is a close up of the engagement of the output gear of or driven by a gear assembly meshing in the flexible rack.

FIG. 8 is a similar view to that of FIG. 2B but showing the deformable rack within its channel which runs preferably adjacent the channel in which the wheels, rollers or the like of the preferred sectional door also runs.

FIG. 9 shows the form(s) of a preferred flexible rack of the present invention and in such a way as to demonstrate how it may be made by progressive moulding steps.

FIG. 14 is a top view of a rack as shown in FIG. 13 (ie; that side having the meshing teeth elements and the transverse interruptions thereof which are the preferred indexing feature of the present invention).

FIG. 15 is an end view of the rack.

FIG. 16 is a side view of a rack of FIG. 14 showing the bifurcation.

FIG. 17 is a bottom view of the arrangement shown in FIG. 14 showing the preferably segmented portions of the rack which are to provide that part of the rack inside of the wall in use.

FIG. 18 is an end view of the rack of FIG. 17.

FIG. 19 is the opposite side view to that depicted in FIG. 16, ie; that which connects the two portions of the bifurcated transverse section.

DETAILED DESCRIPTION

The invention of our New Zealand Patent Specification No. 299720 (equivalent to PCT/NZ97/00144) relates to the gearing assembly as well as the related methods and use and includes combinations thereof in respect of door and/or other structures as described and indeed any use thereof for winching or any other such purpose. The full content thereof is here introduced by way of reference.

Figure 1:
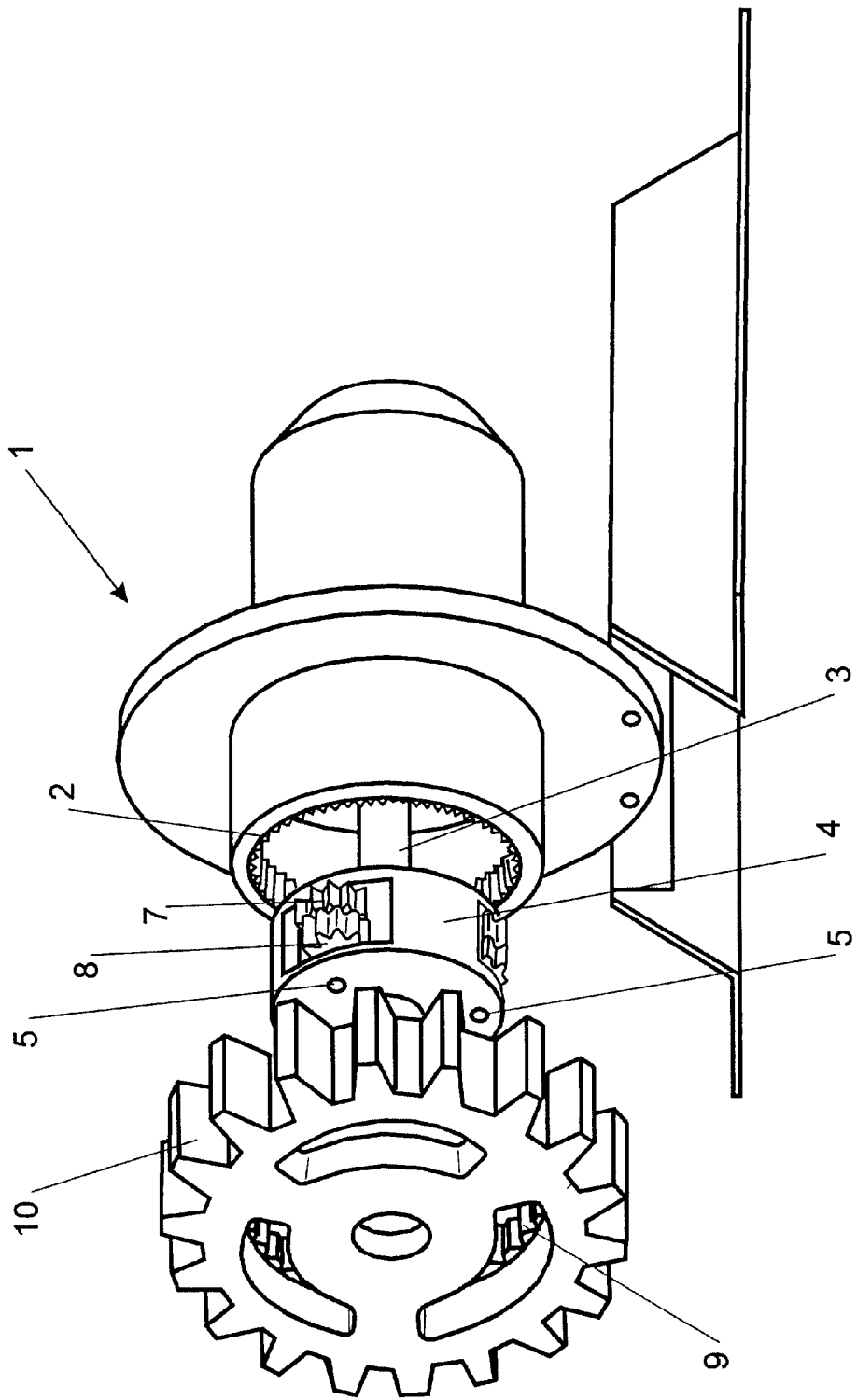
Figure 2A:
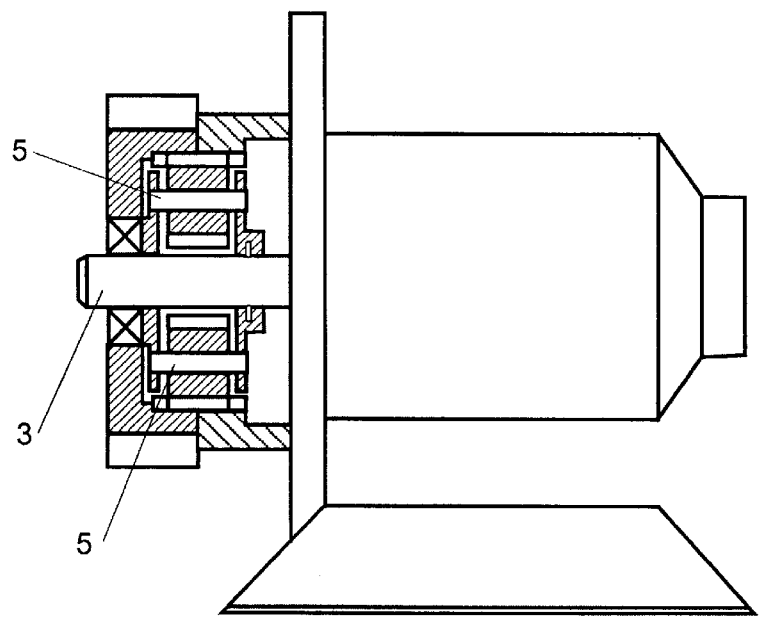
FIG. 2A is a side assembly of the arrangement shown in FIG. 1 showing in cross-section the important aspects of the gear assembly but not showing the electric motor nor any mount or input shaft therefrom in section.
Figure 2B:
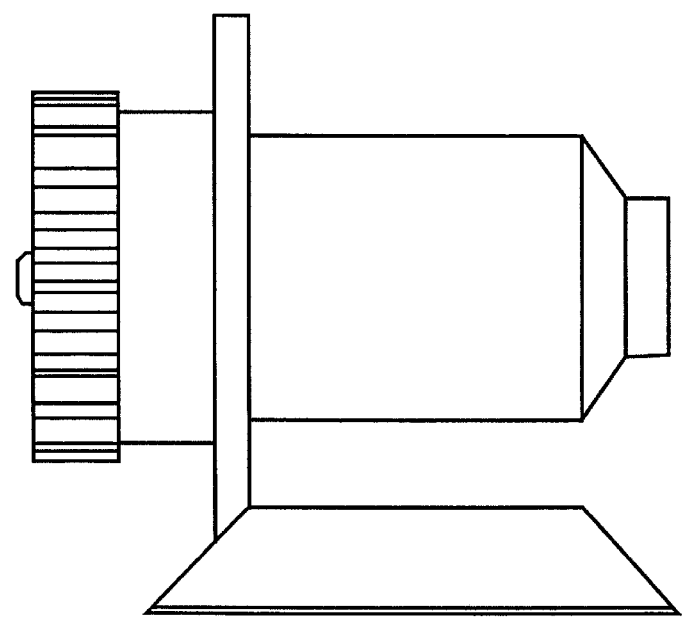
FIG. 2B is a side elevation of the arrangement of FIG. 2A.
Figure 3:
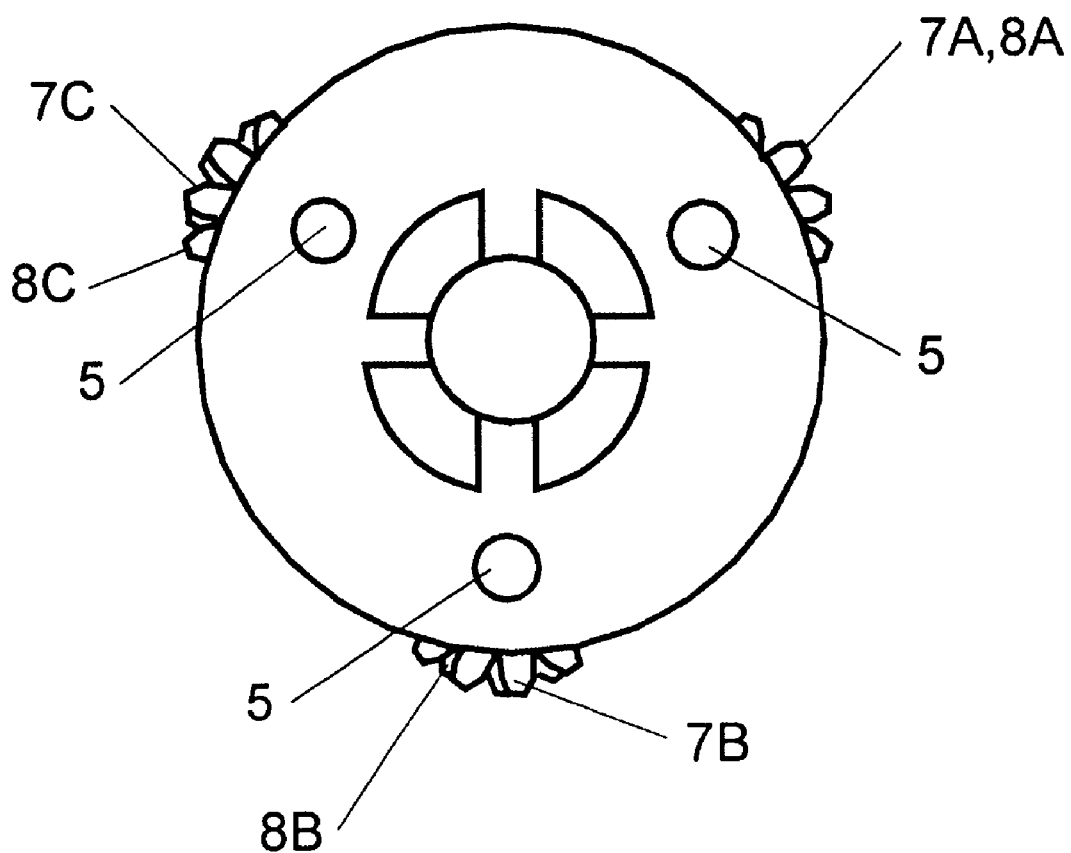
Figure 5:
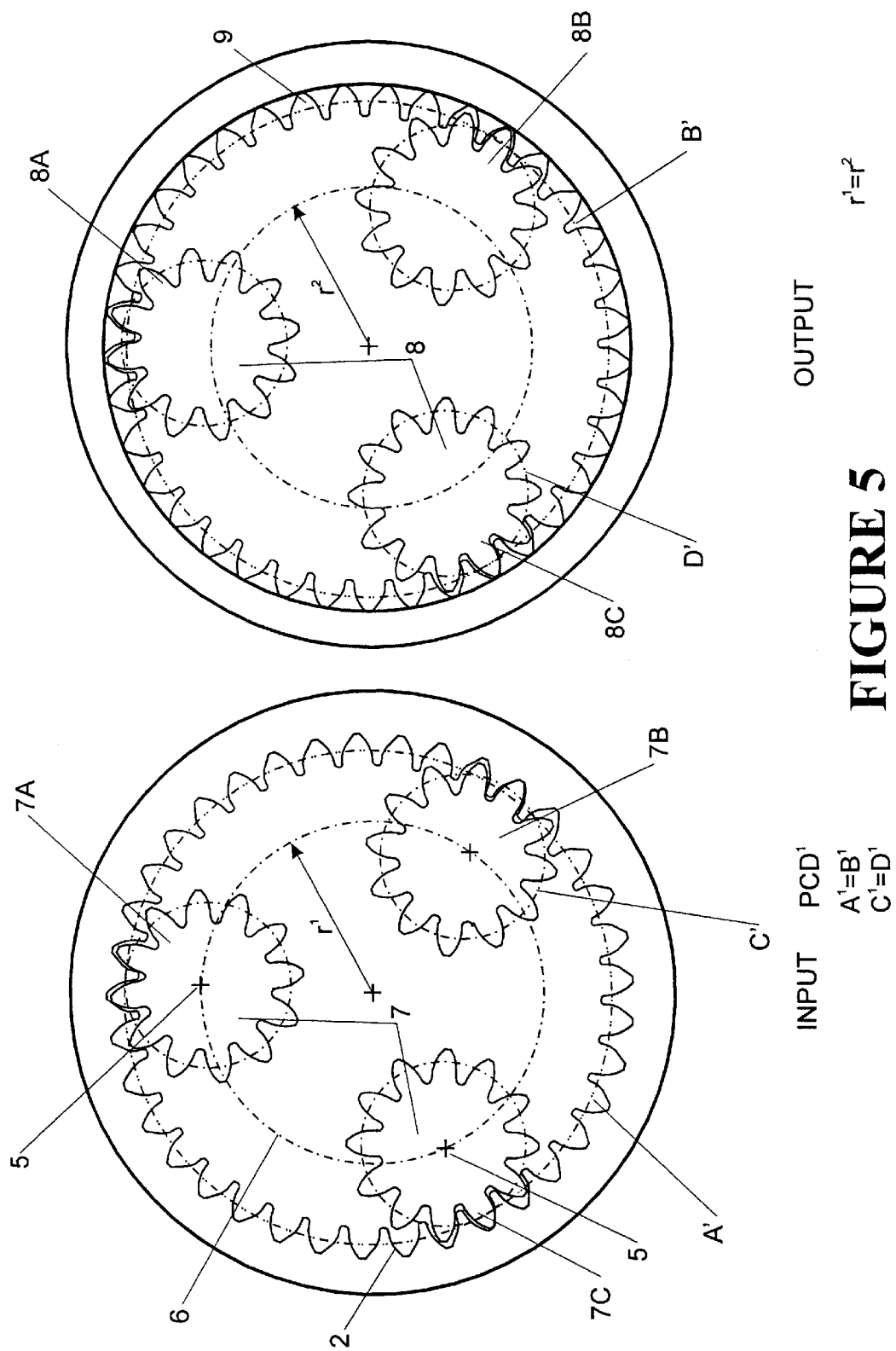
Figure 6:
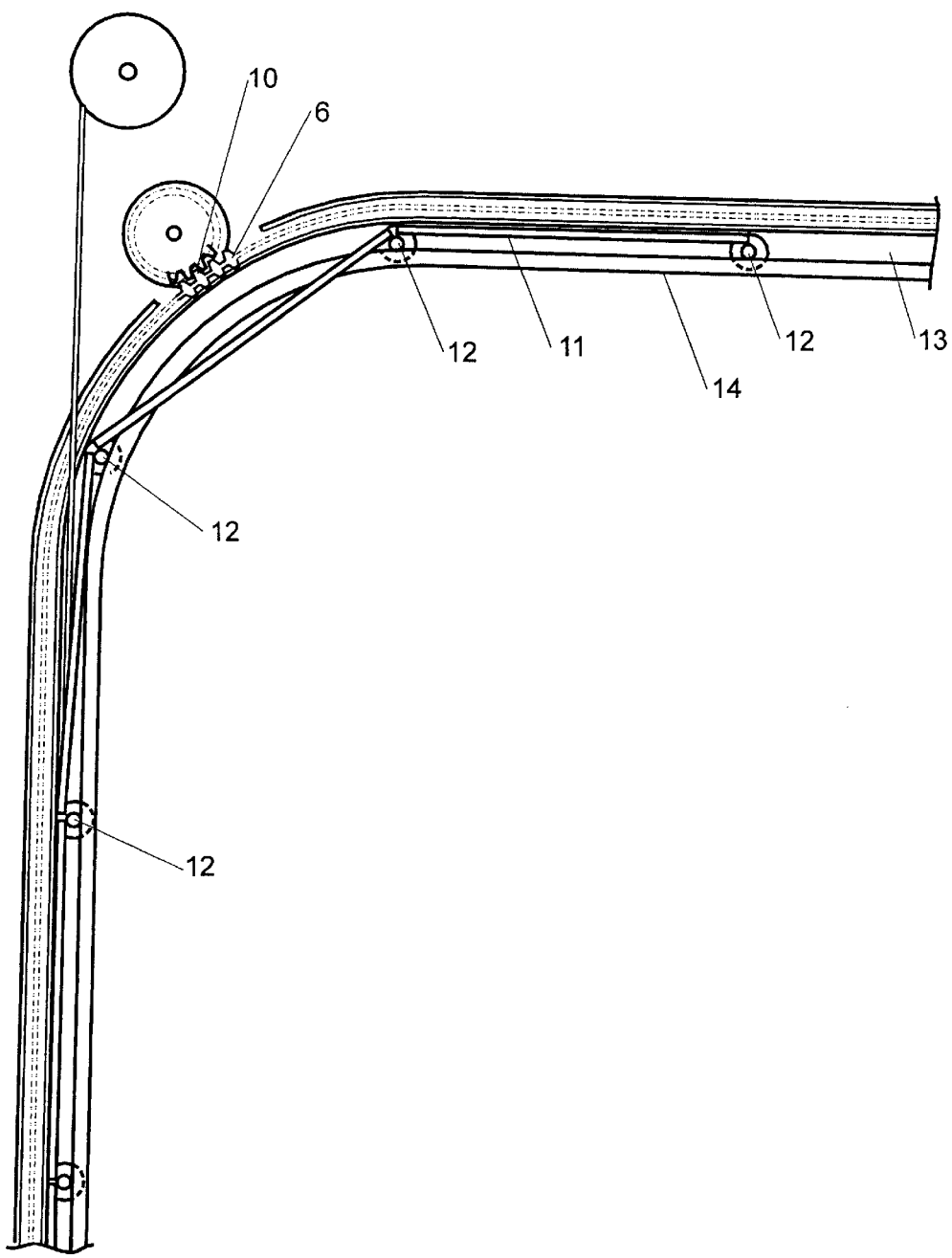

That invention recognises a self braking affect which occurs in the arrangement as depicted when the arrangement as shown in FIGS. 1–3 includes the arrangement as shown in FIG. 5 where, for example, the number of teeth respectively on the input and output internal gears is 36 and 37 respectively and the pitch circle diameters are identical. With such an arrangement there is no significant mechanical advantage of one planetary set engagement with its internal gear over the other like engagement thus meaning that input into the system from the output end has great difficulty because of the 37 or 36 to 1 reduction, in rotating the electric motor input shaft, yet the converse is quite different.

In the preferred form of that invention there is provided a housing-like structure 1 which includes an internal gear 2 (which is the input gear). As shown in FIG. 5 rotatable relative to the preferably fixed internal gear 2 is the input shaft 3 (preferably of an electric motor but of any appropriate input means including a hand cranked input). Splined, keyed or otherwise affixed to that input shaft 3 is a mount, spider or housing 4 which defines a plurality of axes 5 which lie on the circle 6 shown in FIG. 5. Each of these axes 5 is defined preferably by axles common for both the planetary gears 7 of the input side and the planetary gears 8 of the output side.

The output side planetary gears 8 mesh with an internal gear 9 which preferably is formed in a member or structure that preferably includes (as part of the output means) a gear 10.

In the preferred form of the present invention the relationship between the pitch circle diameter A' of the input internal gear 2 and the pitch circle diameter B' of the output internal gear 9 is such that they are identical as shown in FIG. 5. Preferably the sets of planetary gears 7 and 8 (preferably of identical form) rotate on a common set of axles within the same mount or on the same mount 4. Therefore the pitch circle diameters C' and D' are identical notwithstanding the disparity of (preferably one) teeth between the 36 and 37 teeth of the internal gears 2 and 9 respectively.

With the output internal gear being that with one additional tooth the reduction through the gearbox is of 36 to 1.

With the identical pitch circle diameters A' and B' there is no net mechanical advantage of one planetary system over the other (for example under the loading of a sheet of a yacht or a cable or rope, for example, on a winch, or, for example, the weight of the door on the flexible rack hereinafter described) there is little likelihood of the rotation of the shaft 3 or its equivalent.

Figure 4:
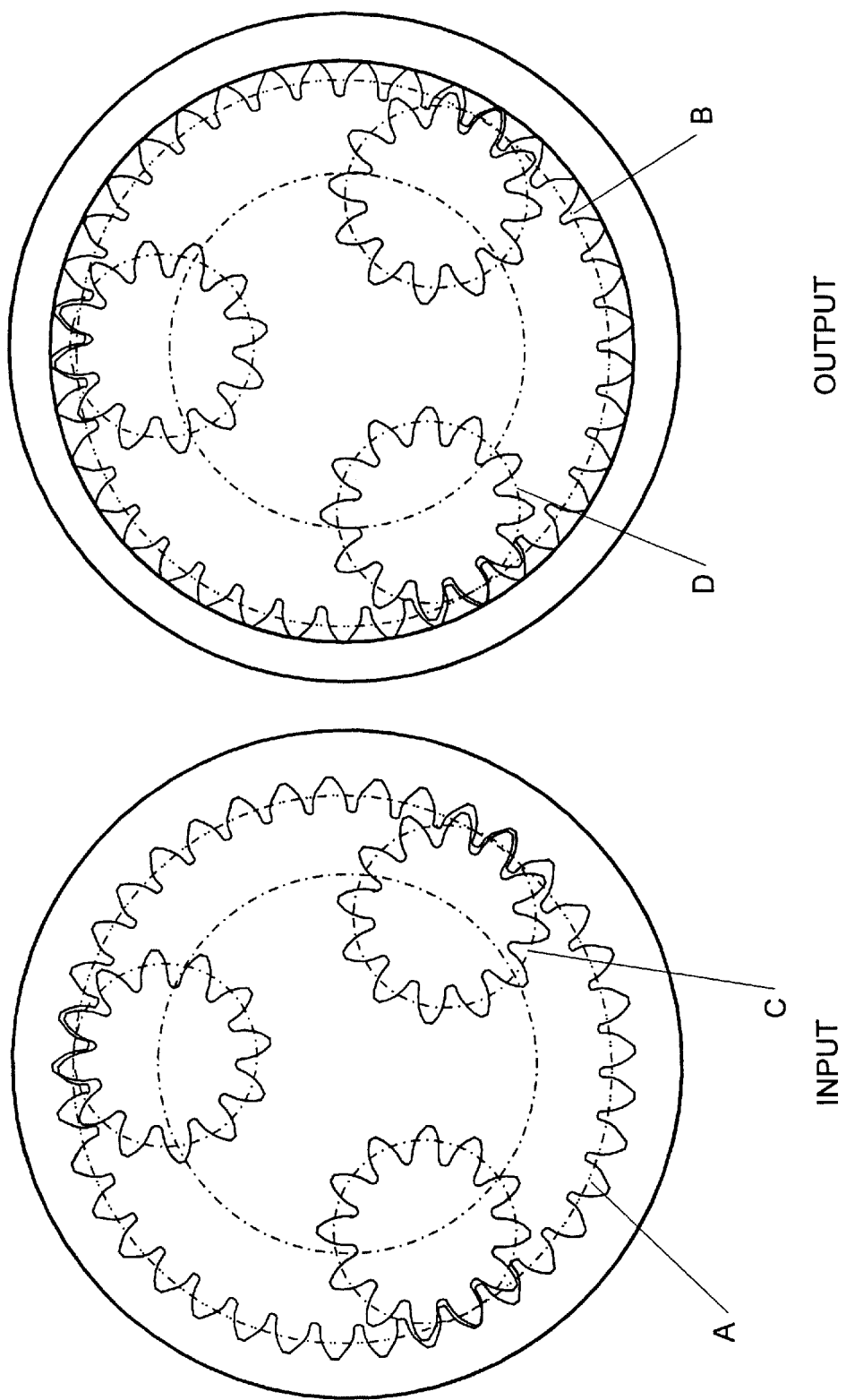

The arrangement as depicted in FIG. 4 is somewhat different and whilst still confined, by way of example, to an input side internal gear of 36 teeth and an output side internal gear of 37 teeth there is a disparity in the pitch circle diameters. By way of example the pitch circle diameter A could be for example 50.80 mm while the pitch circle diameter B could be 52.20 mm. In such an arrangement preferably the pitch circle diameters C and D are respectively 16.23 mm and 17.63 mm in order to provide some semblance of self braking. The self braking however, notwithstanding the disparate tooth numbers on pitch circles A and B (preferably a disparity of one), is not as good as where the pitch circle diameters are identical (eg. as in the case of FIG. 5). As used herein the term "self braking" means no more than the ability to resist the transmission of movement back through the gear assembly from the output side.

Still other variants still within the scope of the present invention are envisaged where there can be adjustments made to cater for differences in pitch circle diameter.

The preferred form of that invention however has a direct input shaft without an sun gear and simply drives a plurality of spaced planetary axle members which on the input side have idle gears driven by the fixed "input" side internal gear so that the thus driven idle input gears directly drive the planetary gears of the output side thereby imparting a rotational drive (and a drive of significantly increased torque) onto the internal gear of the output side.

Preferably the arrangement as shown irrespective of the number of planetary gear sets (which are preferably identical on both the input and output sides) is such that as shown in FIG. 5 the planetary gear pairs 7A and 8A can be moulded with the teeth in phase. Because of the disparity of one between the input and output internal gears preferably however there is a corresponding out of phase relationship between 7B and 8B and between 7C and 8C.

While a non-flexible or non-deformable rack may be used, in the preferred form the rack can configure to a locus parallel to that of the rollers of the door or the equivalent.

Figure 8:
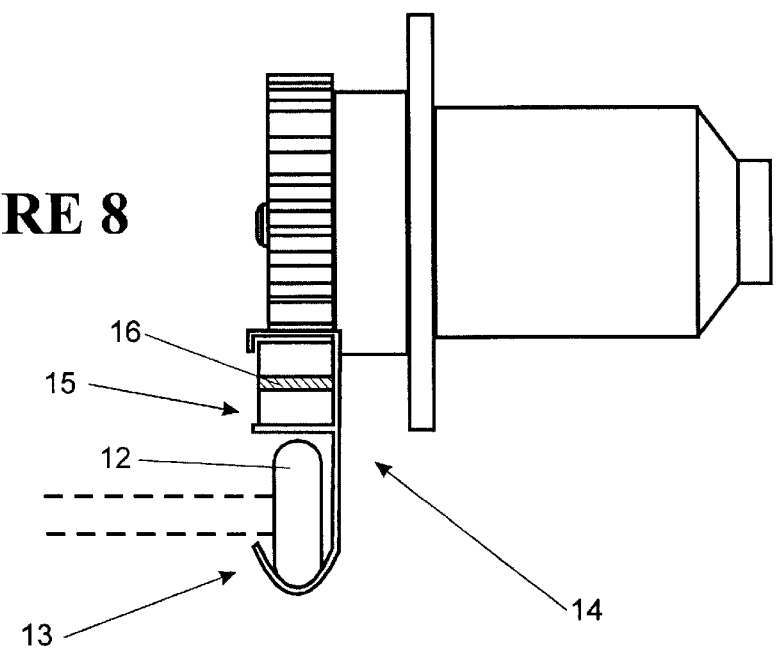

In the preferred form of the present invention a sectional door as might be used for a garage is tracked upwardly and back from the top of a door portal, the sections 11 of the door being supported by rollers at each edge. These rollers 12 are guided within a channel 13 which preferably forms part of a structure 14. Structure 14, (best seen by reference to FIG. 8, not only defines the channel 13 but also another channel 15 (preferably at least in part constricted at its opening—such a constriction not being shown in FIG. 8) which receives there within a flexible or deformable rack 16 preferably to be driven by the output gear 10 of the gear assembly previously described.

Figure 7:
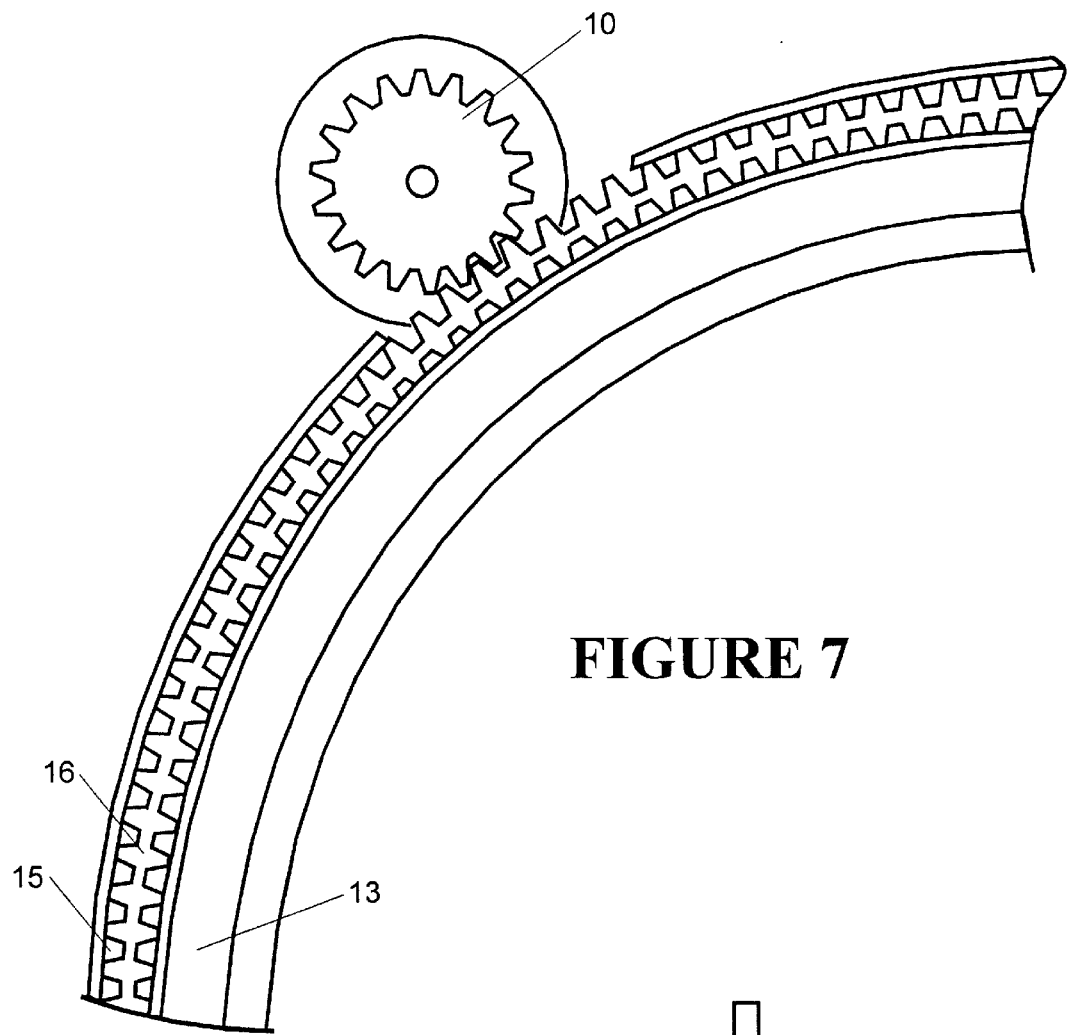

Preferably the flexible rack is a member having teeth 17 (see FIG. 9) incrementally moulded thereon singly or preferably in groups simultaneously as a core or other framing member is preferably configured by the moulding elements to ensure a good grip of the moulded elements thereon). Preferably the flexible rack is provided with teeth 17 on at least that side to be driven as shown in FIG. 7 preferably on a convex curve side of the exposed part of the flexible rack.

Preferably the rack is formed on high tensile strip steel 18 having periodic ridges, kinks or the like 19 (dimples and/or possible even perforations may suffice) onto which the moulded components are formed.

Figure 9:
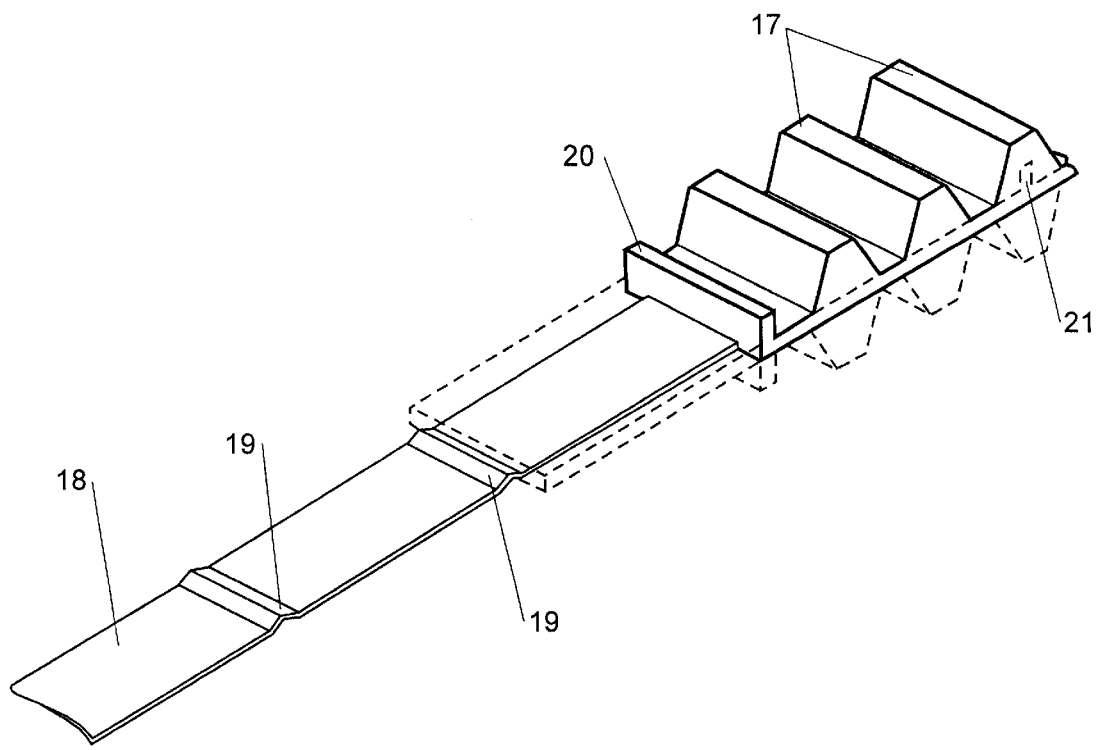

While shown in FIG. 9 there are teeth structures on both sides, this is not a necessity. Indeed it is not a necessity also for any such teeth on both sides or any other structure on the non-driven side of the rack to be coincident with projections on the driven side. It is desirable however to maximise flexibility by maintaining a thinness of section through the moulded part of the composite rack between the teeth-like structures.

As shown an upstand or key form 20 formed by the same moulding operation that forms the teeth to the right as shown in FIG. 9 can be used in a subsequent presentation within the mould means to key or index upstand 20 internally of a tooth of the next mould sequence.

Preferably the kinks or ridges 19 are indexed to be within the mass of the teeth 17.

A person skilled in the art will appreciate how in a situation as depicted in relation to (by way of example) a garage door, it is possible with a single visit, for a door portal to be prepared and a gear assembly in accordance with the present invention mounted at one side of the door structure in a position capable immediately of being powered to drive the door upwardly and downwardly as required whilst leaving space for the lining of the garage. Hitherto door openers and the like have subsequently been positioned so as to require lining prior to door opener fitment.

It is possible with an arrangement as shown for a drive on one side to be sufficient to operate a door successfully. Such success is better guaranteed where skewing of the door is prevented by appropriate counterweighting on both sides and identical guiding within tracks on each side.

Preferably there is fixing of the flexible rack at one point only of the door. With a sectional door because of the variations in length of the door (as it concertinas slightly during its opening) it is not appropriate to fix the flexible rack at each end. It is better to attach at one point only (preferably the lower end although in other forms the upper end will suffice).

Any form of mechanical connection of the door to the flexible rack is sufficient since the rack is capable of operating in both compression and in tension since it is confined guidably within its channel and is preferably structurally strong enough to cope with loadings. Preferably both ends of the rack (especially the end preferably attached to the door section), irrespective of the door condition [fully open, fully closed, and in between] are still within tracking (eg. a channel) for the rack.

While in some forms the rack may be guidable on a rail preferably the track is a channel.

Figure 10A:
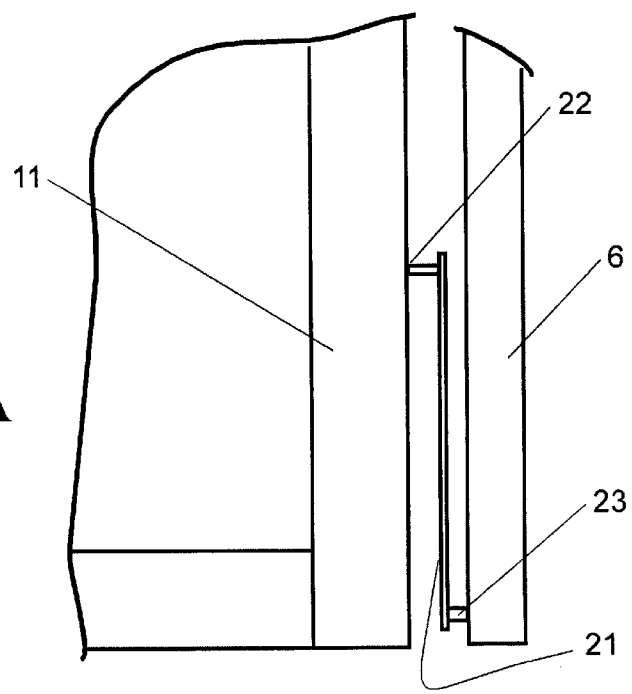
FIGS. 10A and 10B show the two means by which the lower section of a sectional door is engaged to the rack.
Figure 10B:
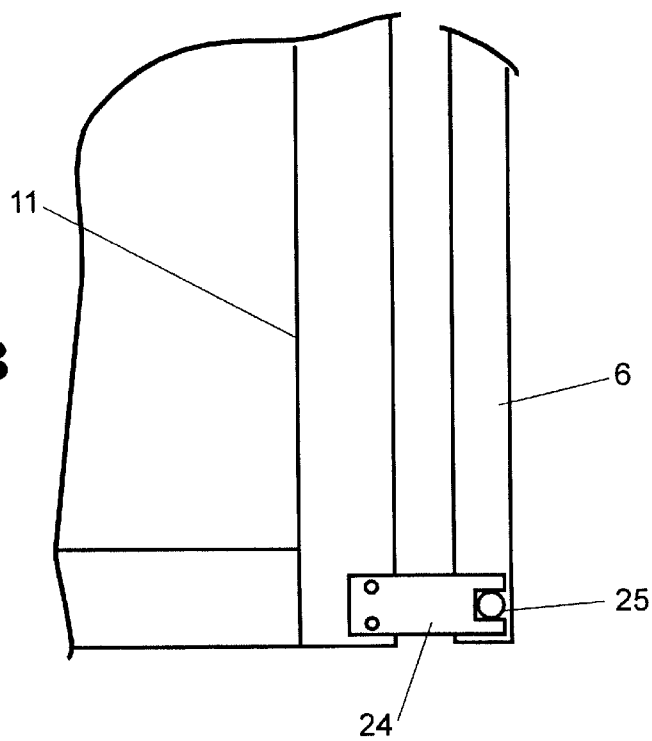

FIG. 10A shows the use of a linkage arm 21 pivotally attached at 22 and 23 respectively to the door section 11 and the rack 6. FIG. 10B shows a different form where a linking plate 24 fixed to the door section (or framing thereof) 11 includes an end to capture a projection 25 of the rack.

The known reproducible movement back and forth on or in its track by the rack allows the rack to be used as a means of setting limits for the operation of any appropriate door controller that might be used as the input means or as part of the input means. For example, the rack could be used to initiate directly mechanical switches or to initiate optical switching means depending on its positioning within its locus of movement and this could be moved to set the door operator in any appropriate known way so that it does not drive beyond the fully closed condition nor drive beyond the fully open condition.

Also well known in the art is a manual override condition for any such doors. In this respect a clutched arrangement (whether a true friction clutch or more preferably a meshed or keyed or dogged inter-engagement type clutch can be utilised. Such an arrangement can be provided as part of the input means or as part of the out from the preferred reduction gearing assembly. Any such system will suffice.

Preferably within the gear assembly dissimilar plastics materials are used for the gearing components so as to minimise wear and noise. Preferably suitable plastics include acetyl plastics and/or nylons as the disparate plastic types.

A person skilled in the art will appreciate how the present invention provides an alternative to existing gear assemblies and indeed also provides an alterative to the driving systems available for, for example, garage doors or, for example, winches.

Figure 11:
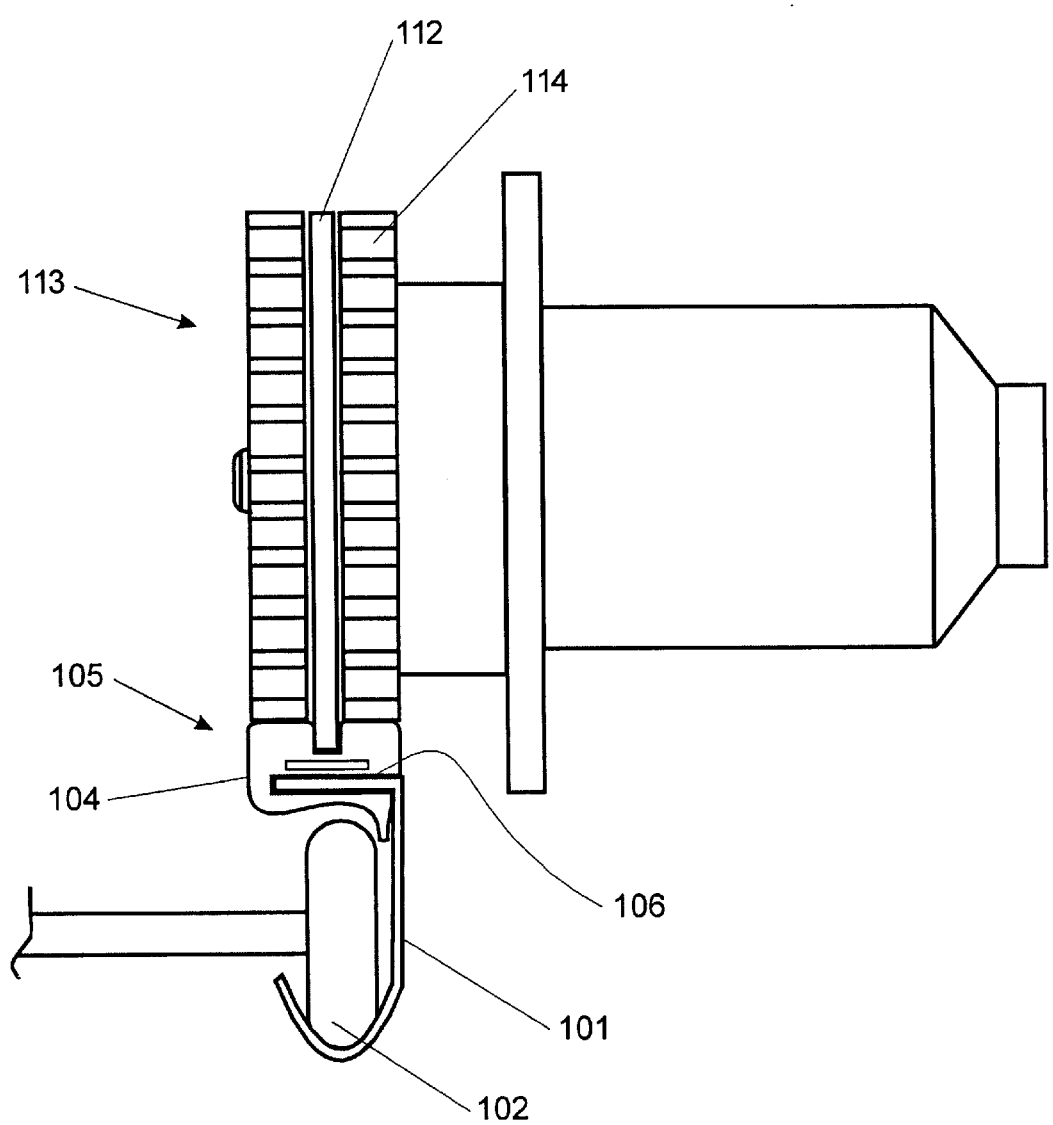
FIG. 11 is a view of an alternative preferred rack in accordance with the present invention having its bifurcated legs in longitudinally projected transverse section located over a wall of a channel type track within which a tracking element (for example, a wheel) of a panel.
Figure 12:
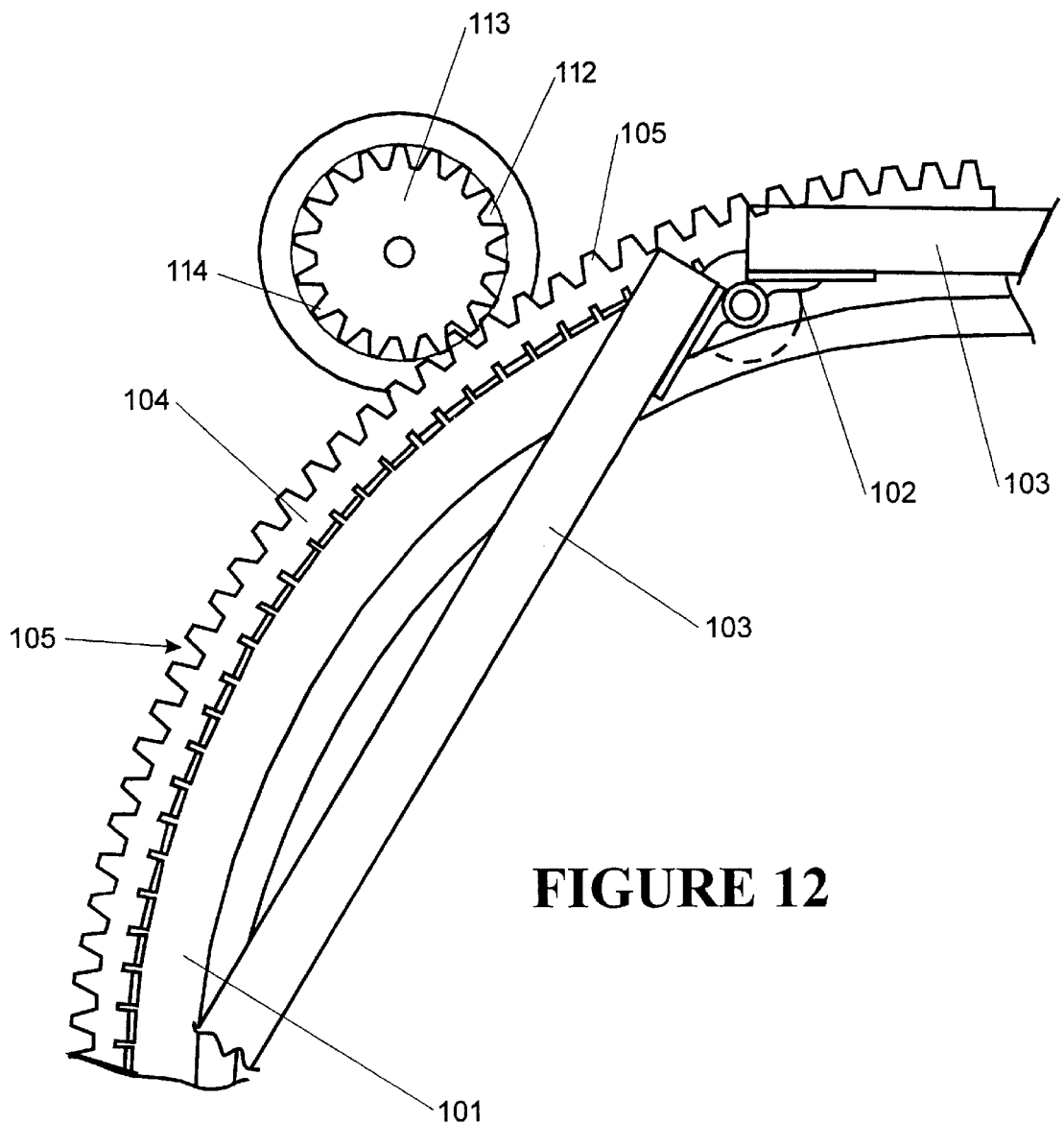
FIG. 12 is a view along the rotational axis of the tracking wheels of a sectioned door showing the convex curvature of part of the tracking locus and the intermeshing and indexing of the driving pinion therewith.
Figure 13:
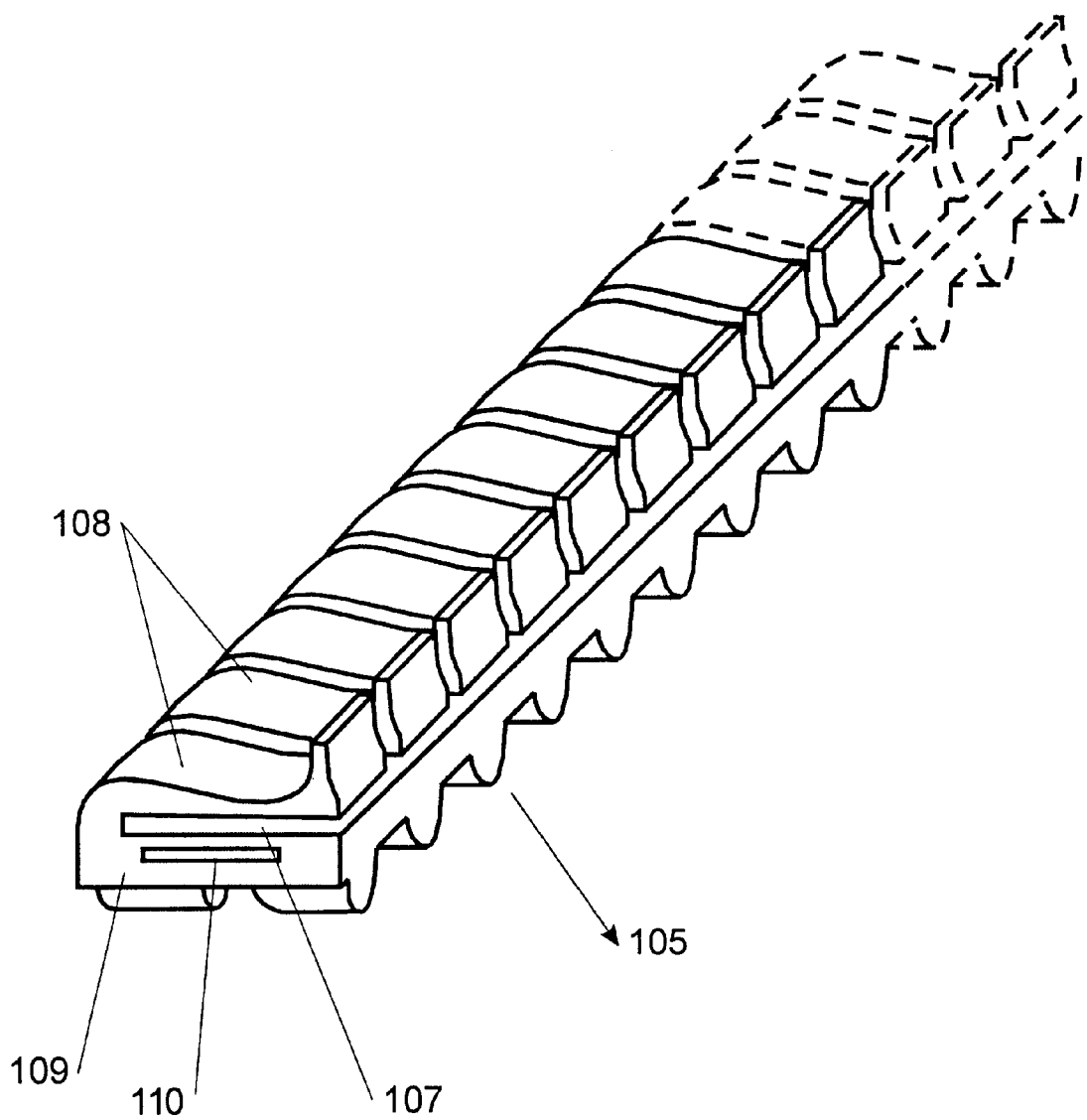
FIG. 13 is a perspective of a rack in accordance with the alternative preferred form of the present invention showing the lower most region thereof.

The alternative form of the present invention recognises the capability as best seen in FIG. 11 of using an existing track 101 of a door which provides a groove within which a wheel 102 tracks and carries the sections 103 of a sectioned door. The rack 104 with its tooth side 105 has its bifurcated legs (defined by longitudinal projection of the transverse section) located over and on either side of the wall 106 of the track 101. This bifurcated feature results from the gap 107 best seen in FIG. 13 with those parts 108 adapted to lie inside of the wall on which the bifurcated rack is located and with that region 109 adapted to lie outside of the wall. The segmenting of the side including the parts 108 facilitates bending of the rack about a locus which presents the side 109 in a convex meshing condition.

The region 109 preferably is moulded about a longitudinal member 110 adapted to take loads in tension eg; steel, carbon fibre, Kevlar, etc. and of course the portion 109 also has the teeth 105 moulded therein.

As can be seen from FIG. 14 the teeth 105 are separated to provide a keying or indexing groove 111 longitudinally of the rack into which a disk or other member 112 of the pinion 113 can index whilst the teeth 114 of the pinion 113 mesh with the teeth 105.

Persons skilled in the art will appreciate how the location of both the pinion and the wheels in the track together act on the rack to hold it located on the wall 106 of the track 101.

It is possible therefore to retrofit as a new door operator/drive combination the combination or kit of the present invention.

What is claimed is:

1. A door assembly having a door guided on either side of said door by a plurality of rollers guided within a first channel of a fixed track to allow reproducible opening and closing of said door, the assembly comprising: a rack entirely guided within a second channel of said track along the entire length of said track during opening and closing, along a fixed locus substantially parallel to said fixed track and connected to the door such that movement of such rack along said fixed locus will cause the opening or closing of the door, the rack being engaged by a meshing door opening and/or closing pinion of a door opener whereby the door is thus capable of being opened upon the door opener controlled rotation of said pinion in one direction and of being closed upon the door opener controlled rotation of such pinion in the other direction.

2. A door assembly as claimed in claim 1 wherein said rack is guided during opening and closing along said fixed locus by a curved track by the rotation of said pinion, said rack being at least sufficiently flexible for that purpose.

3. A door assembly as claimed in claim 2 wherein said pinion provides the drive to said rack for opening and closing of said door at said curved track.

4. A door assembly as claimed in claim 3 wherein said pinion is provided to drive said rack on the convex side of said curved track.

5. A door assembly as claimed in claim 1 wherein said door is a sectioned door having multiple panels hingedly interconnected and said rack follows said fixed locus appropriate for the sectioned door.

6. A door assembly as claimed in claim 1 wherein a lower region only of the door is connected to said rack.

7. A door assembly as claimed in claim 1 wherein said door is counterbalanced by a pulley and weight system linked to the door.

8. A door assembly as claimed in claim 1 wherein only one rack is provided at one side of the door and that rack is attached to said door at a lower corner of said door.

9. A door assembly as claimed in claim 1 wherein said pinion is engages via drive disengaging/engaging means with said door opener.

10. A door assembly as claimed in claim 1, wherein, said rack comprises a flexible elongate member capable of taking loads in tension, and moulded teeth moulded on said elongate member, said rack being deformable in at least one plane.

11. A door assembly as claimed in claim 10 wherein said at least one plane is one that allows the moulded teeth to be configured on the convex curve.

12. A door assembly as claimed in claim 10 wherein said elongate member is in the form of a strap.

13. A door assembly as claimed in claim 12 wherein said strap includes edging modifications which assists in the engagement of the moulded teeth thereto.

14. A door assembly as claimed in claim 10 wherein said teeth are formed from a plastics material.

15. A door assembly as claimed in claim 10 wherein said elongate member is made of a steel and there are ridges formed transversely thereof.

16. A door assembly as claimed in claim 1 wherein said door is counterbalanced by a torsion spring arrangement linked to the door.

17. A door assembly having a door guided by rollers on either side of said door in a first channel of a fixed track to allow reproducible opening and closing of said doors,
wherein a rack is guided in a second channel of said track during opening and closing of said door along a fixed locus defined by a flange of, and being substantially parallel to said fixed track, said rack being connected to the door such that movement of said rack along said fixed locus will cause the opening or closing of the door, the rack being engaged by a meshing door opening and/or closing pinion of a door opener whereby the door is thus capable of being opened upon the door opener controlled rotation of said pinion in one direction, and of being closed upon the door opener controlled rotation of said pinion in the other direction,
and wherein in transverse section said rack has a bifurcated region, said bifurcated region slidably engaged onto said flange,
and wherein the pinion engages the rack over regions thereof on one side of the wall.

18. A door assembly as claimed in claim 17 wherein said pinion not only meshes with the rack outside of the flange but also keys or indexes into the rack by a wheel into a longitudinal accommodation of said rack.

19. A door assembly as claimed in claim 17 wherein said rack is moulded about a tensile strength strengthening member and the axis thereof is on the outside of said flange of said fixed track, to where the door is guided by said fixed track.

20. A door assembly as claimed in claim 17 wherein said door is a sectioned type door.

21. A door assembly as claimed in claim 17 wherein said fixed locus includes a curve and said pinion providing the drive is at said curve.

22. A door assembly as claimed in claim 17 wherein said pinion is on the convex side of a curve.

23. A door assembly as claimed in claim 17 wherein a lower region only of the door is connected to said rack.

24. A door assembly as claimed in claim 17 wherein said door is counterbalanced by a pulley and weight system.

25. A door assembly as claimed in claim 24 wherein said counterbalancing arrangement is attached to the bottom section where the door is a sectioned door and also there is provided one rack only on one edge and that rack is attached to said door at said lower section.

26. A door assembly as claimed in claim 17 wherein said door is counterbalanced by a torsion spring arrangement linked to the door.

* * * * *